(12) United States Patent
Heda et al.

(10) Patent No.: US 8,665,104 B2
(45) Date of Patent: Mar. 4, 2014

(54) SYSTEMS AND METHODS FOR PROTECTING ROTATING MACHINES

(75) Inventors: Sanjeev Shyam Heda, Kennesaw, GA (US); Scott Alan Wood, Suwanee, GA (US); Robert Joseph Iasillo, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 13/097,320

(22) Filed: Apr. 29, 2011

(65) Prior Publication Data

US 2012/0274473 A1    Nov. 1, 2012

(51) Int. Cl.
*G08B 21/00* (2006.01)
*G01M 1/22* (2006.01)

(52) U.S. Cl.
USPC ............ 340/683; 73/66; 340/682; 340/686.2; 700/279; 702/56

(58) Field of Classification Search
USPC .............. 73/66, 570, 593, 660; 340/680, 682, 340/683, 686.2, 697; 369/53.18; 384/1; 700/175, 279, 280; 702/33, 34, 56
See application file for complete search history.

(56) References Cited

U.S. PATENT DOCUMENTS

| | | | |
|---|---|---|---|
| 3,201,776 A * | 8/1965 | Morrow et al. | 340/683 |
| 3,746,028 A * | 7/1973 | Doyle | 137/38 |
| 5,224,835 A * | 7/1993 | Oltman | 417/12 |
| 6,505,143 B1 | 1/2003 | Lakshminarasimha et al. | |
| 6,768,949 B2 * | 7/2004 | Shupe et al. | 702/33 |
| 7,050,943 B2 | 5/2006 | Kauffman et al. | |
| 7,080,290 B2 | 7/2006 | James et al. | |
| 7,222,002 B2 * | 5/2007 | Maine | 701/3 |
| 7,341,428 B2 | 3/2008 | Twerdochlib | |
| 7,676,285 B2 | 3/2010 | Hoyte et al. | |
| 7,826,954 B2 | 11/2010 | Muramatsu et al. | |
| 2003/0212508 A1 * | 11/2003 | Bibelhausen et al. | 702/45 |
| 2004/0255596 A1 * | 12/2004 | Horii et al. | 60/775 |
| 2006/0265153 A1 * | 11/2006 | Astley et al. | 702/56 |
| 2008/0010966 A1 * | 1/2008 | Taware et al. | 60/39.27 |
| 2009/0240471 A1 | 9/2009 | Novis | |

FOREIGN PATENT DOCUMENTS

| | | |
|---|---|---|
| EP | 0620423 B1 | 2/1997 |
| EP | 2073019 A2 | 6/2009 |
| EP | 1813778 A3 | 6/2010 |
| WO | 0188355 A1 | 11/2001 |
| WO | 2010081983 A1 | 7/2010 |

* cited by examiner

*Primary Examiner* — Steven Lim
*Assistant Examiner* — Stephen Burgdorf
(74) *Attorney, Agent, or Firm* — Sutherland Asbill & Brennan LLP

(57) ABSTRACT

Systems and methods for protecting rotating machines are provided. Measurements data collected by a plurality of sensors may be received by a controller that includes one or more computers. The plurality of sensors may be configured to monitor vibrations associated with the rotating machine. Based at least in part upon the measurements data, the controller may determine that a respective amplitude change for at least two of the plurality of sensors exceeds a threshold condition. The controller may also determine that the threshold condition is exceeded for a predetermined period of time. Based at least in part upon determining that the threshold condition is exceeded for a predetermined period of time, the controller may identify an alarm event.

12 Claims, 2 Drawing Sheets

SYSTEMS AND METHODS FOR PROTECTING ROTATING MACHINES

FIELD OF THE INVENTION

Embodiments of the invention relate generally to rotating machines, and more specifically to systems and methods for protecting rotating machines based upon monitoring vibrations associated with the rotating machines.

BACKGROUND OF THE INVENTION

A wide variety of rotating machines, such as gas turbines, include rotating components that may cause significant damage in the event that contact is made with stationary components of the machines. For example, hot gas path damage within a gas turbine may lead to displacement of rotating components and damage to the gas turbine. Conventional monitoring systems have been developed to monitor rotating machines and provide protection by identifying fault conditions. However, these conventional systems are often unable to precisely identify a fault condition and may trigger false alarms. For example, conventional gas turbine monitoring systems typically monitor vibrations based upon a gas turbine load and assumed steady state or baseline conditions. However, because the steady state conditions are subject to fluctuations due to temperature changes and other ambient conditions, false alarms are often generated. These false alarms often result in relatively expensive maintenance procedures and lost revenue due to the gas turbine being taken offline. Accordingly, improved systems and methods for protecting rotating machines, such as gas turbines, are desirable.

BRIEF DESCRIPTION OF THE INVENTION

Some or all of the above needs and/or problems may be addressed by certain embodiments of the invention. Embodiments of the invention may include systems and methods for monitoring and protecting rotating machines. According to one embodiment of the invention, there is disclosed a method for protecting a rotating machine. Measurements data collected by a plurality of sensors may be received by a controller that includes one or more computers. The plurality of sensors may be configured to monitor vibrations associated with the rotating machine. Based at least in part upon the measurements data, the controller may determine that a respective amplitude change for at least two of the plurality of sensors exceeds a threshold condition. The controller may also determine that the threshold condition is exceeded for a predetermined period of time. Based at least in part upon determining that the threshold condition is exceeded for a predetermined period of time, the controller may identify an alarm event.

According to another embodiment of the invention, there is disclosed a system for protecting a rotating machine. The system may include at least one memory, a plurality of sensors, and at least one processor. The at least one memory may be configured to store computer-executable instructions. The plurality of sensors may be configured to monitor vibrations associated with a rotating machine. The at least one processor may be configured to access the at least one memory and execute the computer-executable instructions to: (i) receive measurements data collected by the plurality of sensors; (ii) determine, based at least in part upon the measurements data, that a respective amplitude change for at least two of the plurality of sensors exceeds a threshold condition; (iii) determine that the threshold condition is exceeded for a predetermined period of time; and (iv) identify, based at least in part upon determining that the threshold condition is exceeded for a predetermined period of time, an alarm event.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
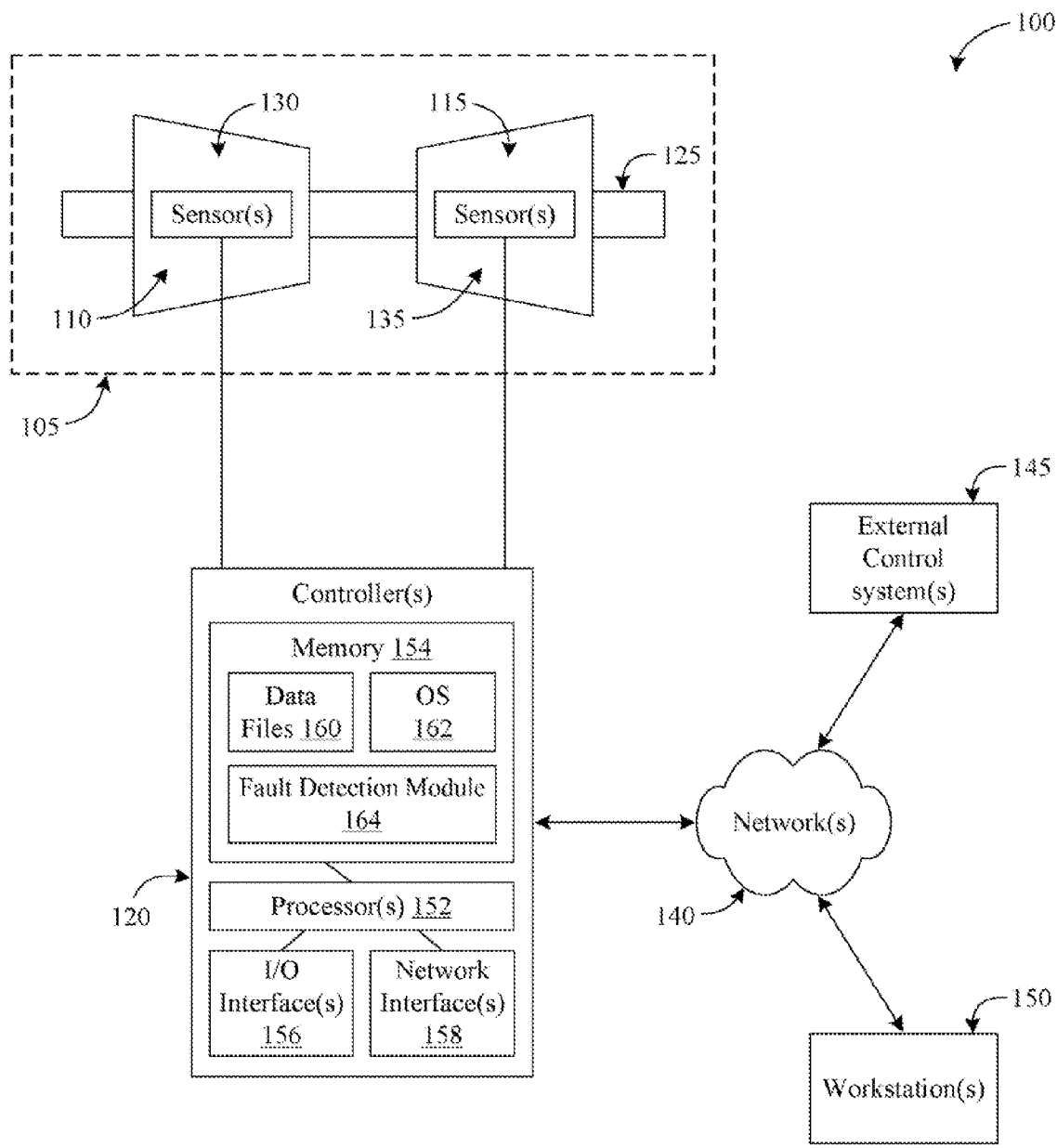

Having thus described the invention in general terms, reference will now be made to the accompanying drawings, which are not necessarily drawn to scale, and wherein:

FIG. 1 is a block diagram of one example system that facilitates the monitoring and/or protection of a rotating machine, according to an illustrative embodiment of the invention.

Figure 2:
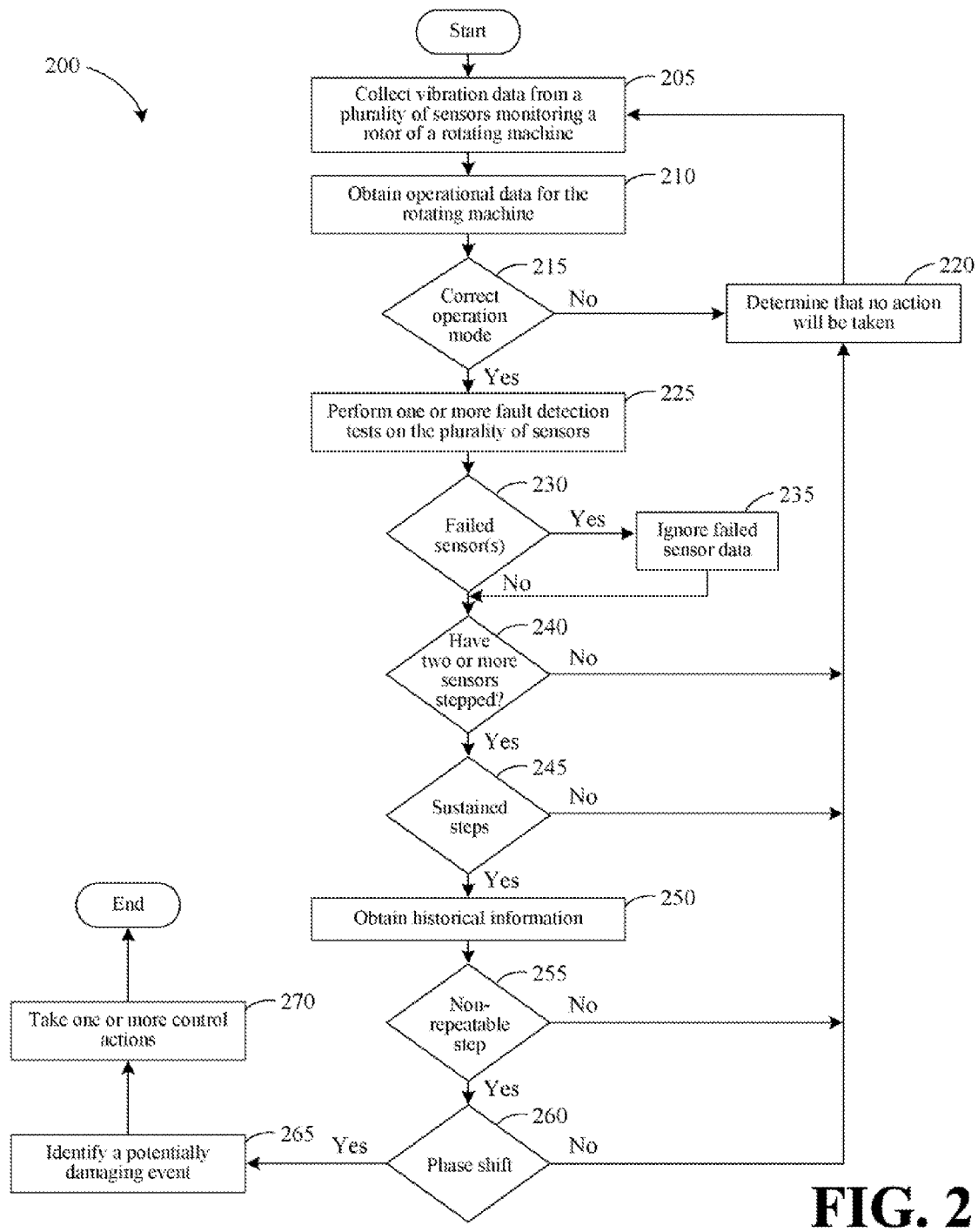

FIG. 2 is a flow diagram of an example method for monitoring a rotating machine in order to identify potentially damaging events, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for monitoring a rotating machine, such as a gas turbine, in order to provide protection for rotating components. In various embodiments of the invention, a plurality of sensors may be utilized to monitor vibration associated with the rotating machine. For example, vibration sensors, such as accelerometers and/or proximity sensors, may be positioned proximate to a rotor associated with the rotating machine. In one example embodiment, vibration sensors may be positioned on one or more bearings and/or bearing caps associated with the rotating machine. For example, a first set of vibration sensors may be positioned on a compressor bearing cap associated with a compressor section of a turbine, and a second set of vibration sensors may be positioned on a turbine bearing cap associated with a turbine section of the turbine.

The vibration sensors may collect vibration measurements data associated with the rotating machine, and at least a portion of the collected data may be provided to one or more suitable controllers, such as a local controller associated with the rotating machine and/or to a central controller that monitors a plurality of rotating machines. A controller may analyze the measurements data in order to determine whether at least two of the plurality of sensors have stepped at the same time. In other words, the controller may determine whether the amplitude changes for at least two sensors have exceeded a threshold condition (e.g., a respective amplitude limit, a percentage of amplitude change threshold, etc.). In the event that the controller determines that at least two sensors have stepped at the same time, the controller may determine whether the steps are sustained steps that are maintained for a predetermined period of time. Based at least in part upon these determinations, the controller may identify a potentially dangerous condition, and the controller may generate an alarm event. For example, the controller may identify a potentially dangerous condition within the hot gas path of a gas turbine, and the controller may generate a suitable alarm.

In certain embodiments, one or more other factors may be taken into consideration during the analysis of measurements data and/or the identification of a potentially dangerous condition. For example, based upon an analysis of the measurements data, the controller may determine whether each of the plurality of sensors is operating properly, and measurements data for one or more sensors that are not operating properly may be ignored or disregarded. As another example, the controller may evaluate one or more operating characteristics associated with the rotating machine, and determine whether one or more operating parameters (e.g., a desired mode of operation) are satisfied by the rotating machine. For example, the controller may determine whether a gas turbine is operating at a desired load condition. As yet another example, historical information associated with the vibration of the rotating machine may be taken into account by the controller or a human operator in order to determine whether the identified sensor steps are non-repeatable events that have not historically occurred. Additionally, as desired, the measurements data may be evaluated in order to determine whether a phase shift identified by a sensor accompanies the identified steps. Indeed, a wide variety of operations may be performed in order to identify a potentially dangerous condition based upon an analysis of the measurements data.

Various embodiments of the invention may include one or more special purpose computers, systems, and/or particular machines that facilitate the monitoring and protecting of rotating machines. A special purpose computer or particular machine may include a wide variety of different software modules as desired in various embodiments. As explained in greater detail below, in certain embodiments, these various software components may be utilized to monitor vibrations associated with a rotor of a rotating machine and to identify alarm events based upon an analysis of the monitored vibrations.

Certain embodiments of the invention described herein may have the technical effect of monitoring vibrations associated with a rotating machine and identifying alarm events based upon an analysis of the monitored vibrations. For example, vibrations associated with a rotor of a gas turbine may be monitored by a plurality of sensors, and potentially dangerous situations that may lead to damage of the gas turbine may be identified based upon an analysis of the monitored vibrations. In this regard, damage to the rotating machine may be avoided and/or limited.

FIG. 1 is a block diagram of one example system 100 that facilitates the monitoring and/or protection of a rotating machine, according to an illustrative embodiment of the invention. The system 100 illustrated in FIG. 1 may include a rotating machine 105, a plurality of sensors 110, 115, and one or more controllers 120. In operation, the plurality of sensors 110, 115 may monitor vibrations associated with the rotating machine, such as rotor vibrations, and measurements data may be provided to the controllers 120. The controllers 120 may analyze the measurements data in order to identify any potentially damaging events.

As desired in various embodiments of the invention, the rotating machine 105 may be any suitable rotating machine that includes a rotor 125 or shaft. As shown in FIG. 1, the rotating machine 105 may be a gas turbine; however, embodiments of the invention may be utilized with pumps, electric motors, steam turbines, hydraulic turbines, and/or other rotating machines. With reference to FIG. 1, the gas turbine may include a compressor component 130 and a turbine component 135 that are mounted onto the rotor 125. As desired, one or more respective bearings may facilitate the mounting of the compressor component 130 and the turbine component 135 to the rotor 125.

The sensors 110, 115 may include any number of sensors configured to measure vibrations associated with the rotor 125 and/or the rotating machine 105. Examples of suitable sensors include, but are not limited to, accelerometers, proximity sensors and/or proximity probes (e.g., sensors configured to measure a distance or gap between a rotating component and a stationary housing, etc.). As desired, various sensors may measure vibration amplitude and/or an angle position of the rotor or a phase of the rotor. The sensors 110, 115 may be positioned to monitor and/or measure vibrations at a wide variety of different positions associated with the rotating machine. In one example embodiment, a first set of sensors 110 may be positioned to monitor vibrations associated with the compressor component 130, and a second set of sensors 115 may be positioned to monitor vibrations associated with the turbine component 135. For example, the first set of sensors 110 may be positioned at or near a compressor bearing cap, and the second set of sensors 115 may be positioned at or near a turbine bearing cap.

In operation, the sensors 110, 115 may collect measurements data, such as vibration measurements data, and the sensors 110, 115 may provide the collected measurements data to the controllers 120. Any number of suitable methods and/or techniques may be utilized to provide collected measurements data to the controllers 120. For example, collected measurements data may be communicated to the controllers 120 and/or intermediary devices in communication with the controllers 120 via any number of suitable networks, such as a local area network, a wide area network, a Foundation Fieldbus network, a Bluetooth-enabled network, a Wi-Fi enabled network, a radio frequency network, and/or any other suitable network. As another example, direct communication links may be utilized to facilitate communication of measurements data from the sensors 110, 115 to the controllers 120. Additionally, in certain embodiments, measurements data may be communicated in real-time or near real-time as the data is collected. In other embodiments, measurements data may be stored and either periodically communicated to the controllers 120 or communicated upon request or upon the identification of a predetermined condition (e.g., an alarm condition, etc.).

With continued reference to FIG. 1, any number of suitable controllers 120 may be provided. In certain embodiments, a controller 120 may be a local controller positioned relatively close to the rotating machine 105. In other embodiments, the controller 120 may be a remote device in communication with the sensors 110, 115 and/or a local machine controller via any number of suitable networks, such as the Internet or another suitable wide area network. As desired, the controller 120 may be in communication with any number of external control systems 145 (e.g., a supervisory control and data acquisition ("SCADA") system, etc.) and/or workstations 150 via one or more suitable networks 140, such as the Internet, a propriety communications networks, or another wide area network.

The controller 120 may include any number of suitable computer processing components that facilitate the processing of measurements data, the determination of whether one or more potentially dangerous conditions and/or alert situations are present, and/or the direction of one or more control actions to address alert situations. Examples of suitable processing devices that may be incorporated into the controller 120 include, but are not limited to, personal computers, server computers, application-specific circuits, microcontrollers, minicomputers, other computing devices, and the like. As such, the controller 120 may include any number of processors 152 that facilitate the execution of computer-readable instructions. By executing computer-readable instructions, the controller 120 may include or form a special purpose computer or particular machine that facilitates the processing of measurements data to provide protection for the rotating machine 105.

In addition to one or more processor(s) 152, the controller 120 may include one or more memory devices 154, one or more input/output ("I/O") interfaces 156, and/or one or more communications and/or network interfaces 158. The one or more memory devices 154 or memories may include any suitable memory devices, for example, caches, read-only memory devices, random access memory devices, magnetic storage devices, etc. The one or more memory devices 154 may store data, executable instructions, and/or various program modules utilized by the controller 120, for example, data files 160, an operating system ("OS") 162, and/or a fault detection module 164. The data files 160 may include any suitable data that facilitates the operation of the controller 120 including, but not limited to, information associated with one or more other components of the system 100 (e.g., the rotating machine 105, the sensors 110, 115, etc.), measurements data received from the sensors 110, 115, operational data associated with the rotating machine 105, operational data associated with the sensors 110, 115, information associated with the identification of alarms and/or alerts, information associated with generated alarms and/or alerts, and/or information associated with control actions directed by the controller 120. The OS 162 may include executable instructions and/or program modules that facilitate and/or control the general operation of the controller 120. Additionally, the OS 162 may facilitate the execution of other software programs and/or program modules by the processors 152, such as the fault detection module 164.

The fault detection module 164 may be a suitable software module configured to evaluate or analyze received measurements data to determine whether any potentially dangerous conditions are occurring in association with the rotating machine 105. In operation, the fault detection module 164 may collect vibration data from the sensors 110, 115. As desired, the fault detection module 164 may also obtain operational data associated with the rotating machine 105, such as load and rotor speed information for a gas turbine. Once information has been collected or obtained, the fault detection module 164 may evaluate the information to determine whether any potentially dangerous conditions are occurring. In certain embodiments, information may be evaluated in real-time or near-real time in order to provide protection for the rotating machine 105.

According to an aspect of the invention, the fault detection module 164 may identify an alert situation or potentially dangerous condition based upon a determination that at least two of the sensors included in the plurality of sensors 110, 115 have stepped at the same time. In other words, the fault detection module 164 may determine whether the amplitude changes for at least two sensors have exceeded a threshold condition (e.g., a respective amplitude limit, a percentage of amplitude change threshold, etc.). In the event that the fault detection module 164 determines that at least two sensors have stepped at the same time, the fault detection module 164 may determine whether the steps are sustained steps that are maintained for a predetermined period of time. Based at least in part upon these determinations, the fault detection module 164 may identify a potentially dangerous condition, and the fault detection module 164 may generate an alarm event. For example, the fault detection module 164 may identify a potentially dangerous condition within the hot gas path of a gas turbine, and the fault detection module 164 may generate a suitable alarm.

In certain embodiments, one or more other factors may be taken into consideration by the fault detection module 164 during the analysis of measurements data and/or the identification of a potentially dangerous condition. For example, based upon an analysis of the measurements data, the fault detection module 164 may determine whether each of the plurality of sensors 110, 115 is operating properly, and measurements data for one or more sensors that are not operating properly may be ignored or disregarded. As desired, the fault detection module 164 may also evaluate one or more operating characteristics associated with the rotating machine 105, and determine whether one or more operating parameters (e.g., a desired mode of operation) are satisfied by the rotating machine 105. For example, the controller may determine whether a gas turbine is operating at a desired load condition.

Additionally, in certain embodiments, historical information associated with the vibration of the rotating machine may be taken into account by the fault detection module 164 or a human operator, such as a human operator of the controller 120 or a human operator utilizing a workstation 150, in order to determine whether the identified sensor steps are non-repeatable events that have not historically occurred. Additionally, as desired, the measurements data may be evaluated in order to determine whether a phase shift identified by a sensor accompanies the identified steps. Indeed, a wide variety of operations may be performed by the fault detection module 164 in order to identify a potentially dangerous condition based upon an analysis of the measurements data.

In the event that a potentially dangerous condition or an alert event is identified, the fault detection module 164 may direct the execution of any number of suitable control actions. For example, the fault detection module 164 may power down the rotating machine 105 and/or schedule maintenance for the rotating machine 105. As another example, the fault detection module 164 may communicate one or more alert messages to control and/or supervisory personnel and/or systems. For example, an email or short message system ("SMS") alert may be communicated to an operator or technician associated with the rotating machine 105.

One example of the operations that may be performed by the fault detection module 164 is described in greater detail below with reference to FIG. 2.

With continued reference to the controller 120, the one or more I/O interfaces 156 may facilitate communication with any number of suitable input/output devices, such as a display, a keyboard, a mouse, a touch screen display, etc., that facilitate user interaction with the controller 120. In this regard, user commands may be received by the controller 120, and information may be displayed and/or otherwise output to a user. The one or more communications or network interfaces 158 may facilitate connection of the controller 120 to any number of suitable networks, such as one or more networks that facilitate communication with the sensors 110, 115 and/or the one or more networks 140 that facilitate communication with the external control systems 145 and/or workstations 150.

With continued reference to FIG. 1, any number of external control systems 145 and/or workstations 150 may be provided. An external control system 145 may be a suitable processor-driven device configured to control operations of one or more rotating machines and/or to evaluate operating conditions associated with the rotating machines. For example, an external control system 145 may include a suitable SCADA system that monitors any number of rotating machines. In certain embodiments, the external control system 145 may include components similar to those described for the controller 120. As desired, the external control system 145 may receive measurements data from any number of local controllers associated with rotating machines. For example, measurements data may be collected for a fleet of gas turbines, and the measurements data may be evaluated or analyzed in order to provide protection for each of the gas turbines included in the fleet.

A workstation 150 may be a suitable processor-driven device configured to facilitate interaction with a user. For example, a workstation 150 may facilitate the presentation of vibration measurements data and historical data to a user, and the user may determine whether identified step events for two or more sensors are non-repeatable events that have not occurred within the past behavior of the rotating machine 105. As desired, a workstation 150 may have components similar to those described above for the controller 120. For example, the workstation 150 may include one or more processors, memories, I/O interfaces, and/or network interfaces.

As desired, embodiments of the invention may include a system 100 with more or less than the components illustrated in FIG. 1. Additionally, certain components of the system 100 may be combined in various embodiments of the invention. The system 100 of FIG. 1 is provided by way of example only.

FIG. 2 is a flow diagram of an example method 200 for monitoring a rotating machine in order to identify potentially damaging events, according to an illustrative embodiment of the invention. The method 200 may be utilized in association with one or more rotating machine systems, such as the system 100 illustrated in FIG. 1. In certain embodiments, the operations of the method 200 may be performed by a suitable controller and/or fault detection module, such as the controller 120 and/or fault detection module 164 illustrated in FIG. 1.

The method 200 may begin at block 205. At block 205, vibration data may be collected and/or otherwise obtained. The vibration data may include measurements data collected by a plurality of sensors configured to monitor a rotating machine, such as the sensors 110, 115 configured to monitor the rotating machine 105 illustrated in FIG. 1. As desired, the plurality of sensors may include a wide variety of different types of sensors, such as accelerometers and/or proximity sensors associated with a rotor of the rotating machine 105. The sensors 110, 115 may monitor vibration amplitudes, phases, and/or angles associated with the rotor.

At block 210, operational data associated with the rotating machine 105 may be obtained, identified, or determined. For example, operational mode data, rotor speed data, and/or load data associated with a gas turbine may be obtained. At block 215, a determination may be made as to whether the rotating machine 105 is operating within a correct operation mode. In other words, the operational mode data may be utilized to determine whether one or more operating parameters for the rotating machine 105 have been satisfied. As one example, a determination may be made as to whether a gas turbine is operating with at least a ninety-five percent (95%) rotor speed and a load of at least forty percent (40%) of a rated load capability. Additionally, a determination may be made as to whether any load changes have occurred within a predetermined period of time, such as the last three minutes. Indeed, a wide variety of operational data may be evaluated in order to determine whether the rotating machine 105 is operating within a correct or desired operation mode.

If it is determined at block 215 that the rotating machine 105 is not operating within a correct operation mode, then operations may continue at block 220, and a determination may be made that no action will be taken. In other words, a potentially dangerous event will not be identified. Operations may then continue at block 205, and monitoring of the rotating machine 105 may continue. If, however, it is determined at block 215 that the rotating machine 105 is operating within a correct operation mode, then operations may continue at block 225.

At block 225, one or more fault detection tests may be performed for the plurality of sensors 110, 115 from which measurements data has been received. For example, one or more data quality and/or in-range sensor fault detection tests may be applied to each of the sensors to determine whether the sensors are operating properly. In one example embodiment, a rolling buffer of measurements data may be maintained, such as a rolling buffer of approximately twenty-five minutes, and a standard deviation may be performed in order to identify measurements and/or sensors that are likely not operating properly. At block 230, a determination may be made as to whether any of the plurality of sensors 110, 115 have likely failed and/or are not operating properly. If it is determined at block 230 that none of the sensors 110, 115 have failed, then operations may continue at block 240 described below. If, however, it is determined at block 230 that one or more sensors 110, 115 have likely failed, then operations may continue at block 235, and measurements data received from the failed sensors may be ignored or disregarded. Operations may then continue at block 240.

At block 240, a determination may be made as to whether two or more sensors have stepped at the same time or approximately at the same time. In other words, the measurements data may be evaluated, and a determination may be made as to whether the changes in amplitude for at least two sensors exceed respective threshold conditions. For example, a determination may be made as to whether a vibration amplitude measured by two or more sensors exceeds a threshold value. As another example, a determination may be made as to whether a degree of change in amplitude measured by two or more sensors exceeds a threshold value. If it is determined at block 240 that two or more sensors have not stepped at the same time, then operations may continue at block 220 described above. If, however, it is determined at block 240 that two or more sensors have stepped at the same time, then operations may continue at block 245.

At block 245, a determination may be made as to whether the identified steps are sustained steps. In other words, a determination may be made as to whether the identified steps are maintained or persist for a predetermined time period. A wide variety of suitable techniques may be utilized as desired to determine whether the steps are sustained. For example, a two-sample T-test may be performed on the measurements data in order to determine whether the steps are maintained. As another example, a timer may be initiated when a stepping event is identified, and the timer may be allowed to count up or down for a predetermined time period. A determination may then be made as to whether the steps are maintained for the duration of the timer counting. If it is determined at block 245 that the steps are not maintained, then operations may continue at block 220 described above. If however, it is determined at block 245 that the steps are maintained, then operations may continue at block 250.

At block 250, which may be optional in certain embodiments of the invention, historical vibration information for the rotating machine 105, such as historical vibration measurements data, may be accessed from memory and/or otherwise obtained. For example, historical information for the past ten minutes may be obtained. Additionally, in certain embodiments, vibration information following the identified steps may be obtained, such as historical information for the ten minutes following the identification of the sustained steps. At block 255, a determination may be made as to whether the identified steps are non-repeatable events. For example, a determination may be made based upon an analysis of the historical (and/or subsequent information) as to whether the identified steps are non-repeatable or relatively isolated events. In certain embodiments, the determination may be made by the controller 120 based upon any number of statistical analysis techniques. In other embodiments, step information and historical information (and/or future information) may be presented to an operator or technician by a workstation or other device, and the operator may determine whether the identified steps are non-repeatable events. If it is determined at block 255 that the identified steps are not non-repeatable events, then operations may continue at block 220 described above. If, however, it is determined at block 255 that the identified steps are non-repeatable events, then operations may continue at block 260.

At block 260, which may be optional in certain embodiments of the invention, the measurements data may be evaluated in order to determine whether an identified phase shift measured by one or more of the sensors 110, 115 accompanied the identified steps. In certain embodiments, the identification of a phase shift at the same time as amplitude steps may signal a potentially dangerous condition. Utilizing an example gas turbine, a potentially dangerous condition may occur if amplitude steps are identified by sensors monitoring a compressor bearing while a phase shift is monitored by one or more sensors monitoring a turbine bearing. If it is determined at block 260 that a phase shift does not accompany the identified steps, then operations may continue at block 220 described above. If, however, it is determined at block 260 that a phase shift accompanies the identified steps, then operations may continue at block 265.

At block 265, a potentially dangerous or a potentially damaging event may be identified for the rotating machine 105. For example, potential hot gas path damages and/or bucket migrations may be identified for a gas turbine. Due to the operations performed by the method 200, the accuracy of identifying potentially damaging events may be enhanced over that of conventional systems, and false alarms may be minimized or reduced.

At block 270, one or more control actions may be taken or directed based upon the identification of a potentially dangerous condition. A wide variety of suitable control actions may be taken as desired in various embodiments of the invention. For example, one or more alerts and/or alarms may be triggered. As desired, alert messages may be communicated to any number of operators, technicians, and/or other recipients associated with the rotating machine 105. As another example, the rotating machine 105 may be shut down or taken offline. As yet another example, maintenance may be scheduled or requested for the rotating machine 105.

The method 200 of FIG. 2 may optionally end following block 270. Alternatively, the method 200 may be continuously performed in a repeating loop in order to monitor a rotating machine.

The operations described and shown in the method 200 of FIG. 2 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 2 may be performed. As desired, the operations set forth in FIG. 2 may also be performed in a loop as a rotating machine is monitored. For example, the operations may be performed every twenty minutes.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
receiving, by a controller comprising one or more computers, measurements data collected by a plurality of sensors configured to monitor vibrations associated with a rotating machine, wherein the rotating machine comprises a gas turbine;
wherein receiving measurements data collected by a plurality of sensors comprises:
receiving measurements data collected by a plurality of sensors monitoring one or more bearings for a rotor associated with the rotating machine;
receiving first measurements data collected by one or more sensors configured to monitor a compressor bearing associated with the gas turbine; and
receiving second measurements data collected by one or more sensors configured to monitor a turbine bearing associated with the gas turbine;
evaluating, by the controller, the measurements data collected by each of the plurality of sensors;
determining, by the controller based at least in part upon the evaluation, whether each of the plurality of sensors is operating properly; and
ignoring, by the controller, measurements data collected from one or more sensors that are not determined to be operating properly;
determining, by the controller based at least in part upon the measurements data, that a respective amplitude change for at least two of the plurality of sensors exceeds a threshold condition;
determining, by the controller, that the threshold condition is exceeded for a predetermined period of time;
obtaining historical information associated with vibration of the rotating machine;
determining, based at least in part upon a comparison of the historical information to the measurements data, that respective amplitude changes of the at least two sensors are non-repeatable events; and
identifying, by the controller based at least in part upon determining that the threshold condition is exceeded for a predetermined period of time, an alarm event.

2. The method of claim 1, wherein receiving measurements data collected by a plurality of sensors comprises receiving measurements data collected by at least one of (i) an accelerometer or (ii) a proximity sensor.

3. The method of claim 1, further comprising:
identifying, by the controller, one or more operating characteristics associated with the rotating machine; and
determining, by the controller based at least in part upon an evaluation of the one or more operating characteristics, that one or more operating parameters for the rotating machine are satisfied.

4. The method of claim 1, further comprising:
outputting, by the controller for display to an operator, the historical information and the measurements data, wherein the comparison is performed by the operator.

5. The method of claim 1, further comprising:
identifying, by the controller based at least in part upon the measurements data, a phase shift for at least one of the plurality of sensors,
wherein identifying an alarm event comprises identifying the alarm event based upon the identified phase shift.

6. The method of claim 1, further comprising:
directing, by the controller based upon the identified alarm event, at least one control action.

7. A system, comprising:
at least one memory configured to store computer-executable instructions;
a plurality of sensors configured to monitor vibrations associated with a rotating machine, wherein the rotating machine comprises a gas turbine;
wherein the plurality of sensors is configured to monitor one or more bearings for a rotor associated with the rotating machine and comprises:
one or more sensors configured to monitor a compressor bearing associated with the gas turbine; and
one or more sensors configured to monitor a turbine bearing associated with the gas turbine; and
at least one processor configured to access the at least one memory and execute the computer-executable instructions to:
receive measurements data collected by the plurality of sensors;
evaluate the measurements data collected by each of the plurality of sensors;
determine, based at least in part upon the evaluation, whether each of the plurality of sensors is operating properly;
ignore measurements data collected from one or more sensor that are not determined to be operating properly;
determine, based at least in part upon the measurements data, that a respective amplitude change for at least two of the plurality of sensors exceeds a threshold condition;
determine that the threshold condition is exceeded for a predetermined period of time;
obtain historical information associated with vibration of the rotating machine;
determine based at least in part upon a comparison of the historical information to the measurements data, that respective amplitude changes of the at least two sensors are non-repeatable events; and
identify, based at least in part upon determining that the threshold condition is exceeded for a predetermined period of time, an alarm event.

8. The system of claim 7, wherein the plurality of sensors comprise at least one of (i) an accelerometer or (ii) a proximity sensor.

9. The system of claim 7, wherein the at least one processor is further configured to execute the computer-executable instructions to:
identify one or more operating characteristics associated with the rotating machine; and
determine, based at least in part upon an evaluation of the one or more operating characteristics, that one or more operating parameters for the rotating machine are satisfied.

10. The system of claim 7, wherein the at least one processor is further configured to execute the computer-executable instructions to:

output, for display to an operator, the historical information and the measurements data, wherein the comparison is performed by the operator.

11. The system of claim 7, wherein the at least one processor is further configured to execute the computer-executable instructions to:
   identify, based at least in part upon the measurements data, a phase shift for at least one of the plurality of sensors, wherein the alarm event is identified based upon the identified phase shift.

12. The system of claim 7, wherein the at least one processor is further configured to execute the computer-executable instructions to:
   direct, based upon the identified alarm event, at least one control action.

* * * * *